United States Patent [19]
Buttke et al.

[11] Patent Number: 5,219,532
[45] Date of Patent: Jun. 15, 1993

[54] REDUCED GAS HOLDUP IN CATALYTIC REACTOR

[75] Inventors: Robert D. Buttke, Naperville; John R. Frey, Aurora, both of Ill.

[73] Assignee: Amoco Corporation, Chicago, Ill.

[21] Appl. No.: 642,466

[22] Filed: Jan. 17, 1991

Related U.S. Application Data

[60] Division of Ser. No. 533,388, Jun. 5, 1990, which is a continuation-in-part of Ser. No. 249,605, Sep. 26, 1988, Pat. No. 4,950,459, which is a division of Ser. No. 87,394, Aug. 20, 1987, Pat. No. 4,806,458.

[51] Int. Cl.⁵ .................. B01J 8/20; C10G 23/06
[52] U.S. Cl. .................... 422/140; 208/143; 208/146; 422/145; 422/147
[58] Field of Search ............ 422/140, 147, 143, 146, 422/145; 208/143, 146

[56] References Cited

U.S. PATENT DOCUMENTS

| | | | |
|---|---|---|---|
| 3,414,386 | 12/1968 | Mattix | 422/140 X |
| 3,523,763 | 8/1970 | Van Driesen et al. | 422/140 |
| 4,804,458 | 2/1989 | Buttke et al. | 422/140 |
| 4,859,430 | 8/1989 | Julian et al. | 422/310 |
| 4,886,644 | 12/1989 | Chan et al. | 422/147 X |
| 4,990,314 | 2/1991 | Herbst et al. | 422/140 X |

Primary Examiner—Robert J. Warden
Assistant Examiner—Amalia Santiago
Attorney, Agent, or Firm—Scott P. McDonald; Richard A. Kretchmer; Frank J. Sroka

[57] ABSTRACT

A reactor for refining resid includes an elongated vertical vessel containing a bed of catalyst which is expanded or ebullated by a liquid/gas mixture. The mixture rises in an updraft through the bed and then is recirculated with an increased velocity by an ebullating pump. To reduce gas holdup of the ebullated bed and to promote a more uniform flow, the gas is entrapped by two cascaded stages of baffles which have an internal conical shape to guide, direct, and entrap the gas. One of these two stages has a shape which creates a countercurrent in the flowing liquid to deflect any catalyst particles which might otherwise be elutriated by the increased velocity.

8 Claims, 8 Drawing Sheets

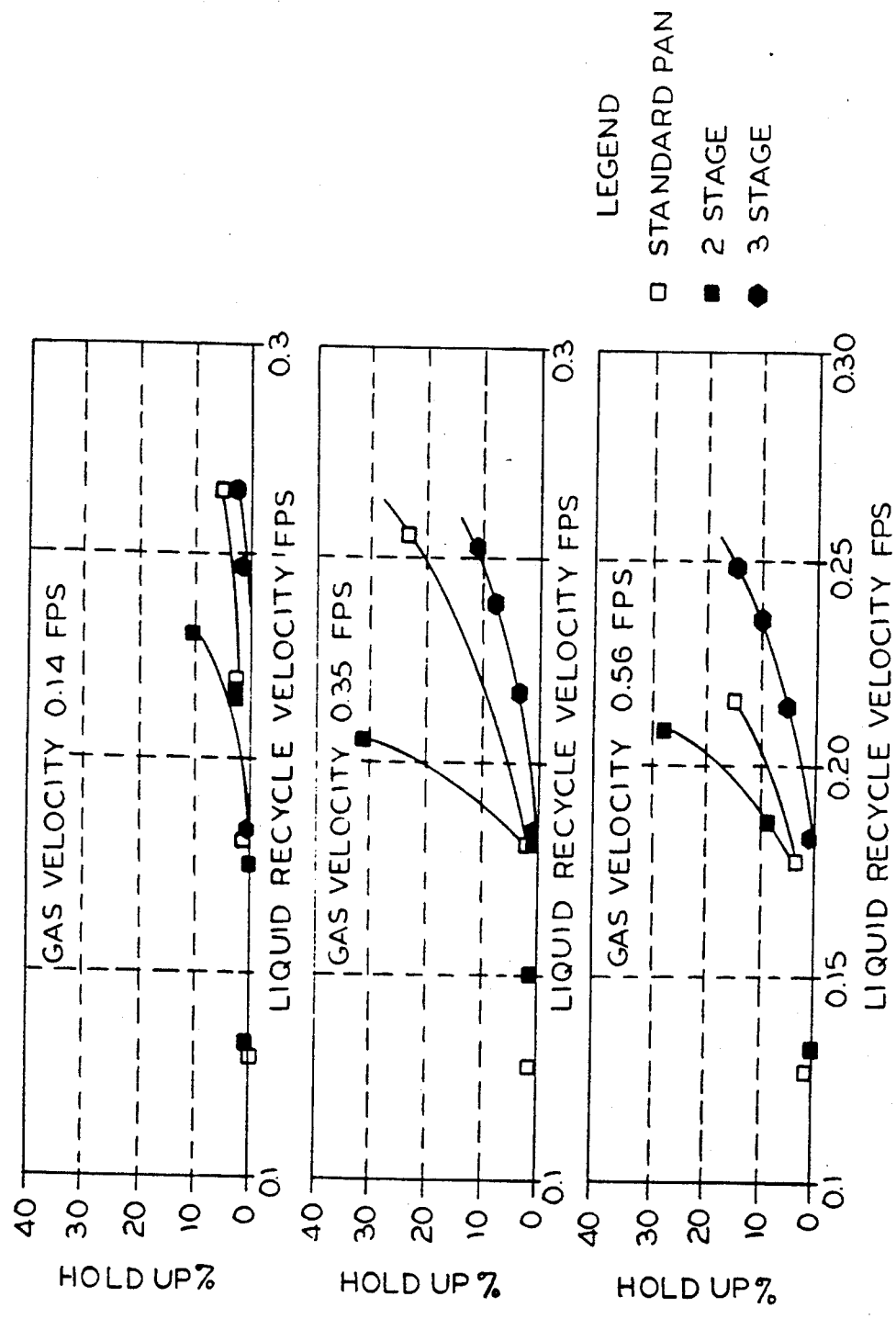

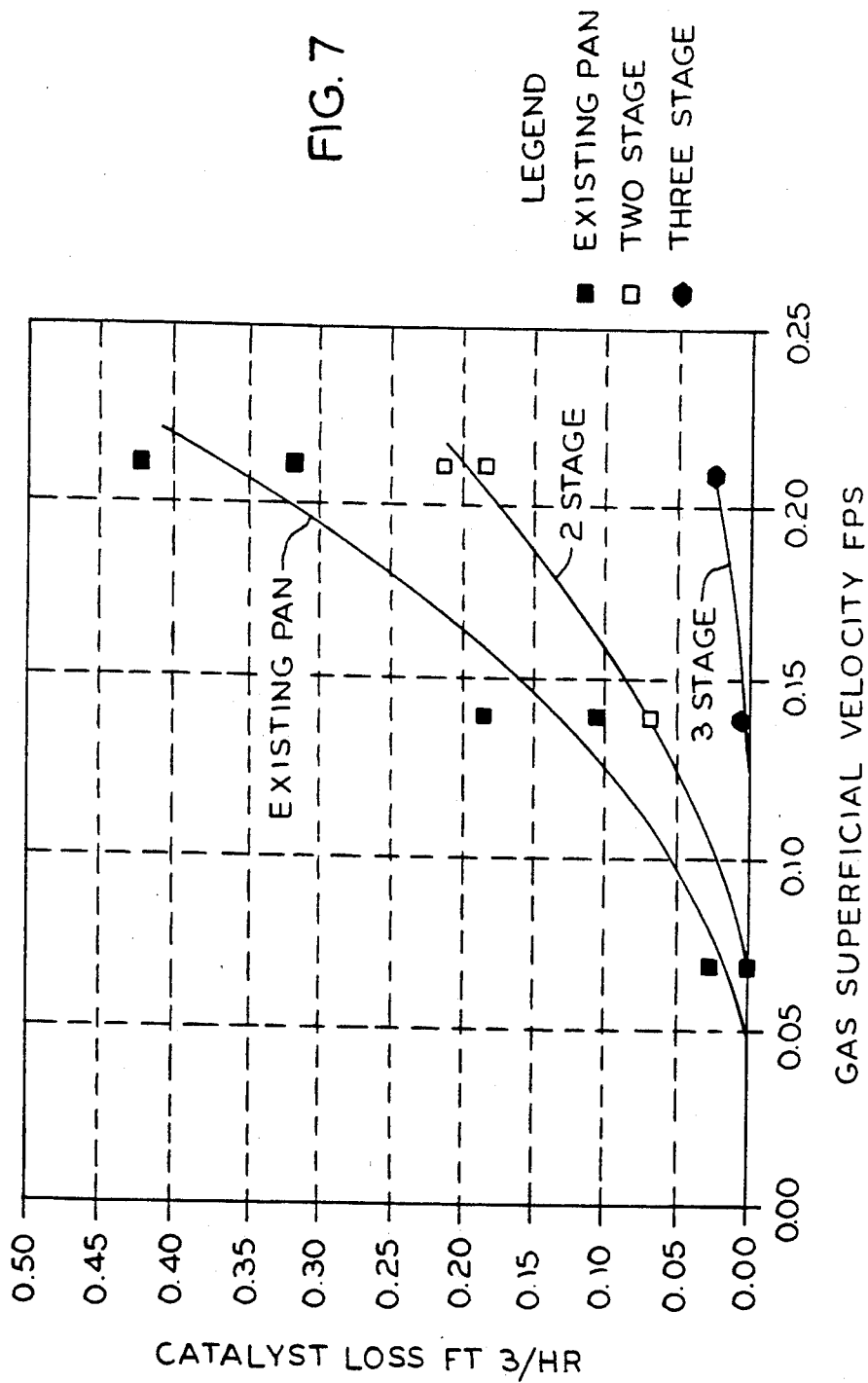

REDUCED GAS HOLDUP IN CATALYTIC REACTOR

This is a division of application Ser. No. 533,388, filed Jun. 5, 1990 which is a continuation in part of Ser. No. 249,605, filed Sep. 26, 1988, now U.S. Pat. No. 4,950,459, which in turn is a divisional of Ser. No. 087,394, filed Aug. 20, 1987, now U.S. Pat. No. 4,804,458.

This invention relates to catalytic reactors and more particularly to reactors with a reduced gas holdup in an expanded catalytic bed used—especially, but not exclusively—for upgrading resid.

For purposes of this disclosure, the term "vapor", refers to and comprises excess hydrogen, light hydrocarbon gases, hydrogen sulfide, ammonia, steam, etc. emitted in the reaction zone.

Reference is made to U.S. Pat. No. 4,804,458 which shows two of the three stages described herein. Much information which is described in detail in this patent may complete the information set forth hereinafter. A number of other patents show reactors and processes which have been suggested for processing oil. Typifying these prior art reactors and processes are those found in U.S. Pat. Nos. 3,124,518, 3,227,528, 3,414,386, 3,677,716, 4,057,397, 4,097,243, 4,221,653, and Re. 25,770. These prior art reactors and processes have met with varying degrees of success.

During hydrotreating, residual oil ("resid") is upgraded with hydrogen and a hydrotreating catalyst in a three-phase mixture of oil, catalyst, and vapor or gas bubbles to produce more valuable, lower-boiling liquid products. The gas phase (hydrogen) is required in some minimum quantity in order to carry out the catalytic refining process within the reactor.

In order to increase the efficiency, effectiveness, and profitability of resid hydrotreating, it is desirable to maximize the conversion of resid into more valuable lower boiling liquid products. The extent of the conversion of resid into these more valuable lower-boiling liquid products depends in part on the residence time of the resid inside the reactor which, in turn, depends upon the effective volume of the reactor itself.

In greater detail, a reactor has a very large, sealed vessel or chamber containing a bed of catalytic particles. In ebullated (expanded) bed reactors, the reactor oil and catalyst bed are fluidized, ebullated, and expanded. The oil and gas rising within the chamber lifts and expands the catalyst bed. However, the gas rising through the bed also occupies space which tends to reduce the liquid volume available for upgrading the resid. If excessive amounts of the gas phase (vapor) is entrained in the recycled reactor oil it can lead to a high internal recirculation of gas which can cause an even higher gas holdup. This further reduces the liquid volume for thermal reactions within the reactor. Therefore, any decrease in gas volume within the reactor increases the residence, or dwell time, of the resid within the reactor.

As described thus far, the reactor oil does not usually have enough velocity to properly expand the catalyst bed above its settled level; therefore, some of the oil is recycled within the reactor. More particularly, a portion of the rising oil overflows and collects in a recycle pan from where it falls through a downcomer or pipe and then returns to the bottom of the catalyst bed under the force imparted by an ebullating pump. The rising oil entrains some gas as it enters the recycle pan. The relatively large volume of the recycle pan decreases the velocity of the recycle oil and allows some entrained gas bubbles to escape. However, some of the entrained gas remains in the recycle liquid.

The U.S. Pat. No. 4,804,458 provides a second stage in the form of a frustroconical skirt, under the recycle pan, in order to entrap and vent the entrained gas before it can reach the downcomer and be recirculated. The present invention adds a third stage which is a second skirt that entraps and vents even more of the entrained gas before it can reach the downcomer. In order to minimize gas entrainment in the recycle liquid, vapor or gas bubbles in the reaction zone are trapped and caught in both of the skirts at a predetermined positions below the upper surface of the liquid (i.e. below the liquid level). The entrapped gas is directed or injected into a vapor containing space above the liquid level.

It has been found that there is a close relationship between reactor liquid volume and reactor gas holdup. More particularly, resid conversion is a thermal reaction, with the catalyst serving to stabilize the cracked products. Since it is a thermal reaction, the resid conversion increases with an increase in temperature and with an increase of the dwell or residence time of the liquid within the reactor. Since the residence time varies directly with liquid volume within the reactor, an increase in the liquid volume (decrease in gas volume) increases the amount of resid conversion. The Ramscarbon conversion also increases because the reaction of coke precursors depends strongly upon thermal reactions. In a large refinery, this amount of increased resid and Ramscarbon conversion can bring an economic advantage which may easily exceed $1.5 million per year at today's prices.

Hence, there is a dilemma since a certain minimum mass rate of gas is necessary, but excess volume of gas is undesirable. There is a constant need for reducing gas holdup without sacrificing the mass rate of gas that is available for necessary upgrading reactions.

Another point is that the rising gas creates a very strong updraft zone(s) within the ebullated catalyst bed. Catalyst particles become entrained in these zone(s), and a low concentration of catalyst particles exists above the catalyst bed proper. Entrained or elutriated particles can result in slow but persistent flow of catalyst down the recycle line. Some of these particles may also pass out of the reactor with the refined product. Among the unfavorable effects of such elutriation are a break up of the catalytic particles in the recycle pump or loss of inventory control of the catalyst.

Therefore, another purpose of the inventive third stage in the reactor is to create flow currents around the lower skirt which have the effect of blocking particle entrainment and the resulting elutriation.

Accordingly, an object of the invention is to provide new and improved means for and methods of reducing gas holdup in an expanded catalytic bed.

Another object of the invention is to create flow currents under the recycle pan which greatly reduce particle entrainment in the oil and elutriation from the reactor and return entrained catalyst particles in the freeboard to the catalyst bed.

Yet another object is to maintain a more uniform inlet pressure for the recycle pump. In this connection, an object is to stabilize the recycle pump flow.

In keeping with an aspect of the invention, the novel ebullated bed reactor has a feed line which feeds a mixture comprising oil and hydrogen-rich gases into the plenum of the reactor. The feed is circulated within the vessel and the catalyst bed is expanded by an ebullating pump located in the lower portion of the reactor. A tubular downcomer extends generally upward from the ebullating pump and into the freeboard zone. A stationary recycle pan in the upper portion of the vessel is connected to the upper end of the downcomer in order to separate vapor from the recycle reactor oil flowing into the downcomer. An annular skirt is connected to the bottom of the pan and extends downwardly and outwardly therefrom for collecting vapor and gas in the upper portion of the freeboard zone.

Beneath the annular skirt is a second skirt in the form of a toroid with a beveled roof for collecting raising vapor or gas which may be in the oil. Between the downcomer and the internal periphery of the second and toroidal skirt, there is a first and relatively large annular gap. A second and smaller annular gap is at the external periphery of the toroidal skirt which is close to the reactor wall. Since the first gap is much larger than the second gap, and in view of the shape of the skirts, a circulatory liquid flow pattern develops around the second skirt. The circulating liquid entrains catalyst particles and returns them to the catalyst bed along a path extending downward through the second annular gap.

A more detailed explanation of the invention is provided in the following description and the appended claims taken in conjunction with the accompanying drawings.

BRIEF DESCRIPTION OF THE DRAWINGS

FIGS. 6 and 7 are graphs showing the comparative advantages of the one, two, and three stages of the invention;

DETAILED DESCRIPTION OF THE PREFERRED EMBODIMENT

Figure 1:
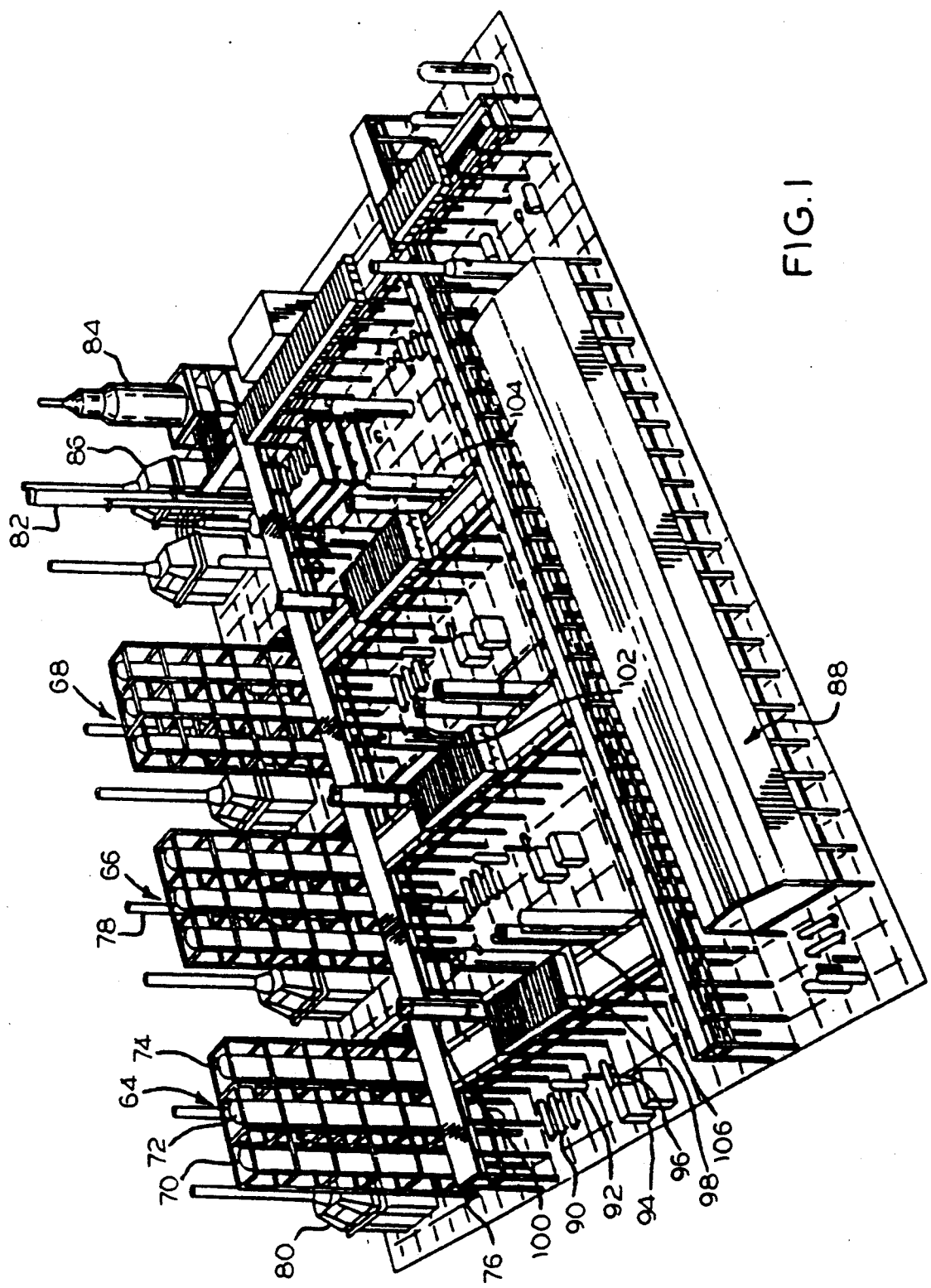
FIG. 1 is a perspective view of resid hydrotreating units and associated refinery equipment for carrying out the process.

High-sulfur resieual oil feed, also called vacuum-reduced crude, comprising 1,000+° F. resid and heavy gas oil, is fed into resid hydrotreating units (RHU) 7, 8, 9 (FIG. 1) along with a hydrogen-rich feed gas. Each resid hydrotreating unit is a reactor train comprising a cascaded series or set of three ebullated (expanded) bed reactors 10, 12, and 14. In the reactors, the resid is hydroprocessed (hydrotreated) in the presence of fresh or equilibrium hydrotreating catalyst and hydrogen to produce an upgraded effluent product stream with reactor tail gases (effluent off gases) leaving used spent catalyst. Hydroprocessing in the RHU includes demetallation, desulfurization, denitrogenation, resid conversion, oxygen removal (deoxygenation), and removal of Ramscarbon.

The resid hydrotreating units and associated refining equipment (FIG. 1) comprise three identical parallel trains of cascaded ebullated bed reactors 10, 12, and 14, as well as hydrogen heaters 16, influent oil heaters 18, an atmospheric tower 20, a vacuum tower 22, a vacuum tower oil heater 24, a hydrogen compression area 26, oil preheater exchangers 28, separators 30, recycled gas compressors 32, air coolers 34, raw oil surge drums 36, sponge oil flash drums 38, amine absorbers and recycle gas suction drums 40, and sponge oil absorbers and separators 42.

Each of the reactor trains comprises three ebullated bed reactors coupled in series. The oil feed typically comprises resid oil and heavy gas oil. The feed gas comprises upgraded recycle gases and fresh makeup gases. Demetallization primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid.

The resid hydrotreating unit is quite flexible. If desired, the same catalyst can be fed to one or more of the reactors or a separate demetallation catalyst can be added to the first reactor while different catalysts can be added to the second or third reactors. Alternatively, different kinds of catalysts can be fed to each of the reactors if desired. Typically, the used and spent catalyst contains nickel, sulfur, vanadium, and carbon (coke). Many tons of catalyst are transported into, out of, and replaced in the ebullated bed reactors daily. Hence, the cost and preservation of catalyst becomes an important economic factor in the refinery operation.

The products produced from the resid hydrotreating units in the ebullated bed reactors include light hydrocarbon gases, light naphtha, intermediate naphtha, heavy naphtha, light distillate, mid-distillate, light gas oil, vacuum naphtha, light vacuum gas oil, heavy vacuum gas oil, and hydrotreated vacuum resid. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying or cooling the spent catalyst. Light and heavy vacuum gas oils and light gas oil are useful as feedstock for a catalytic cracker. The vacuum resid can be sent to cokers to produce coke.

Figure 2:
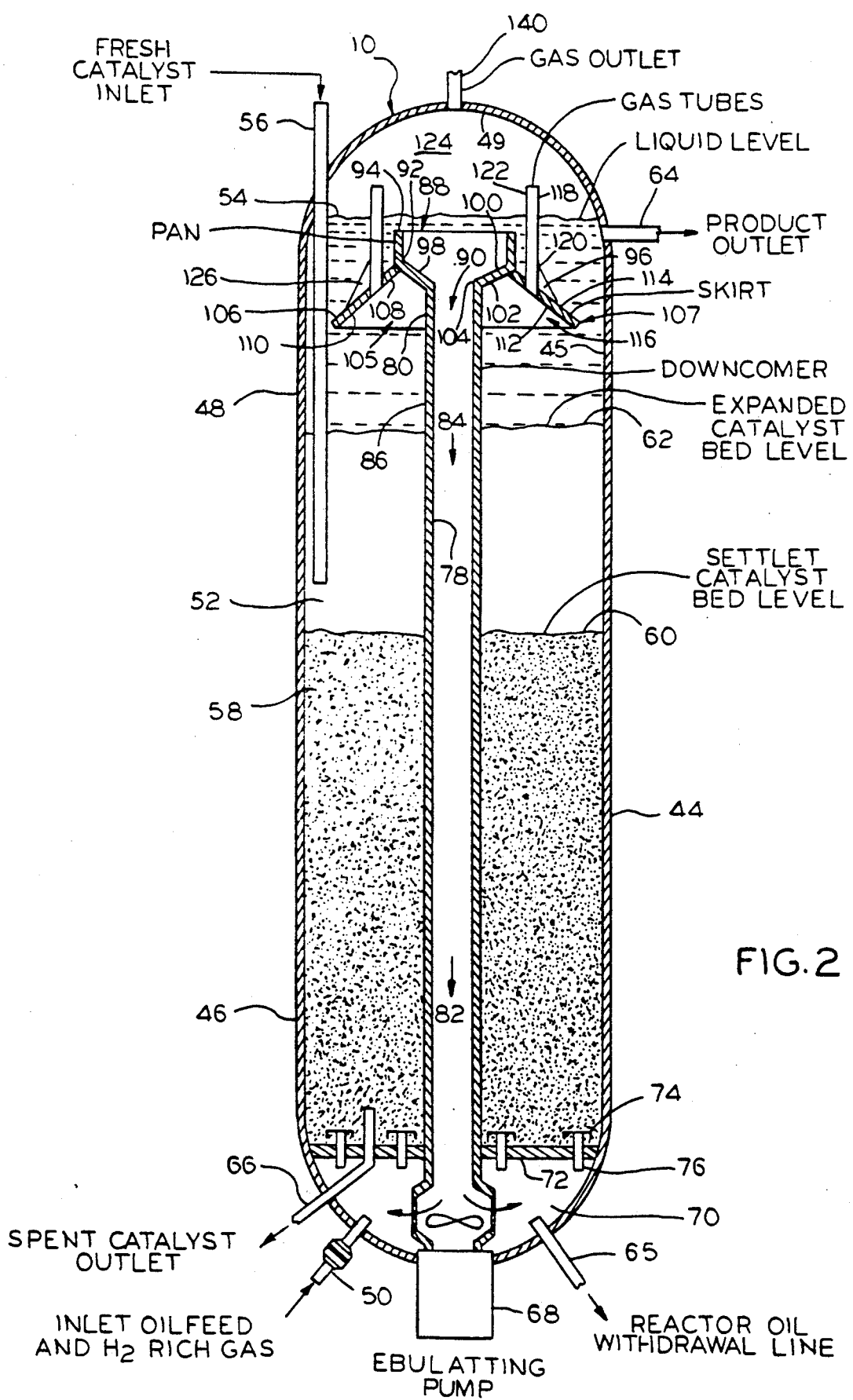
FIG. 2 is a cross-sectional view of the ebullated bed reactor equipped with a two stage vapor collector in accordance with the teachings of U.S. Pat. No. 4,804,458.

The ebullated bed reactor 10, as illustrated in FIG. 2, is an elongated vessel 44 with an upright wall 45, having a lower portion 46 and an upper portion 48 with a top, roof or dome 49. An oil feed line 50, conduit or pipe, provides an oil feed comprising resid (resid oil) and hydrogen-rich gases into the reaction zone 52 in the lower portion 46 of the vessel 44. The top surface of the liquid (reactor oil) in the reactor 10 is called the liquid level 54. A catalyst feed line, conduit or pipe 56 feeds fresh or replacement hydrotreating catalyst into the upper portion 48 of the reaction zone 52 to provide a catalyst bed 58 in the vessel 44. A spent catalyst outlet, withdrawal line, conduit or pipe 66 withdraws spent catalyst from the lower portion 46 of the vessel 44. The catalyst bed 58 can be expanded from a settled bed level 60 to an expanded catalyst bed level 62. Part of the inventive structure is to prevent entrained catalyst particles from being elutriated out of the bed.

The upgraded oil produced in the vessel 44 is withdrawn through an upper product outlet pipe or withdrawal line 64. Alternatively, a lower product outlet, pipe or withdrawal line 65 can withdraw the product near the surface of the liquid level 54 and discharge the product out of the reactor near the lower portion 46 of the vessel 44. The lower product outlet pipe 65 can extend downwardly along the upright wall 45 of the vessel 44 in the reaction zone 52 through the distribution plate 72.

Ebullated bed reactors have many advantages over fixed bed reactors. They enable an operation at higher average temperatures and permit the addition and withdrawal of catalyst without requiring a reactor shutdown. They avoid plugging due to dirty feed and help minimize formation of solids during resid conversion. Ebullated bed reactors may be operated at extremely high temperatures and pressures.

An ebullating pump 68 is located in the lower portion 46 of the vessel 44, for controlling, expanding and varying the height of the catalyst bed 58 as well as for circulating the oil. More particularly, since the liquid resid feed does not usually have enough velocity to expand the catalyst bed above its settled level, liquid is recycled from the upper portion 48 of the reactor 10 to the bottom of the reactor 10 through a vertical downcomer, pipe or recycle line 78. Then, the recycled liquid is pumped through the reaction zone 52 of the reactor 10 at a velocity sufficient to attain the required degree of expansion in order to keep the catalyst bed fluidized. Liquid recycle flow rates and the catalyst bed 58 level in reactors are controlled by varying the speed of the ebullating pump 68 which can range from about 400 to 1,800 RPM.

An elongated stationary tubular downcomer 78 extends generally upward above the ebullating pump 68 to recirculate oil after it has risen through the catalyst bed. The downcomer 78 has an upper end portion 80 and a lower end portion 82. The upper end portion 80 of the downcomer 78 also has an inner surface 84 and outer surface 86.

The lower portion 46 of the reactor includes a bottom section 70 with a horizontal distributor plate 72 which separates the reaction zone 52 from the bottom section 70 of the reactor 10. The distributor plate 72 has a multitude of bubble caps 74 and risers 76 which direct the flow of oil and hydrogen-rich gases upwardly and into the reaction zone 52, while preventing a flow of the catalyst downwardly into the bottom section 70.

A recycle pan 88 serves as one stage of the vapor separator in order to help disengage or separate the hydrogen gas and other vapors from the liquid or oil feed entering the downcomer 78. The large diameter of the recycle pan 88 decreases the velocity and motion of the oil, making it easier for gas vapors and bubbles to escape entrainment. The internally recycled oil feed continues through the ebullating pump 68 and through the reaction zone 52.

Figure 3:
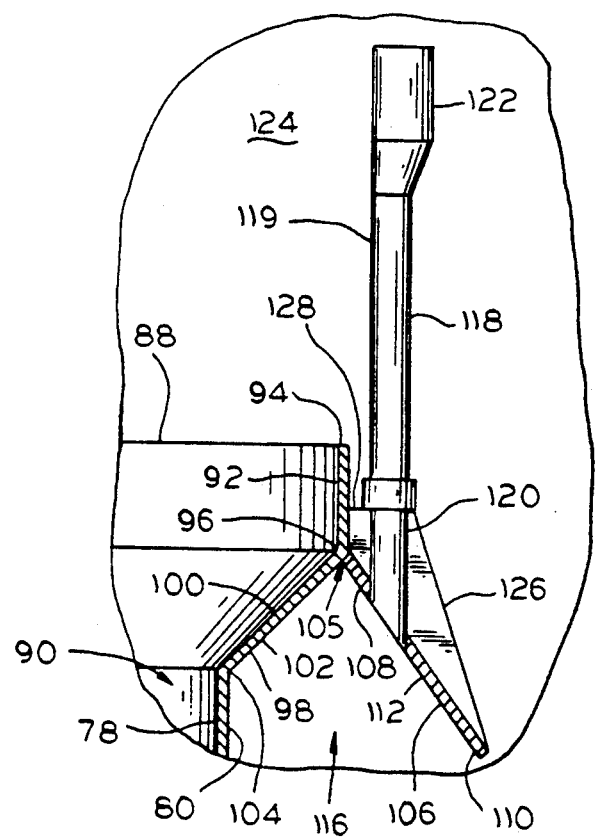
FIGS. 3 and 4 are enlarged partial-cross sectional views of other embodiments of the vapor collector in accordance with the principles of U.S. Pat. No. 4,804,458.

The recycle pan 88 is fabricated of a metal, such as stainless steel, which resists corrosion from the oil feed, gases and products produced in the reactor 10 and which substantially maintains its structural integrity and strength at hydrotreating conditions. The recycle pan 88 (FIGS. 2 and 3) has an inner centrally located feed passageway 90 and is generally funnel-shaped with a substantially circular upright wall 92 having a top portion 94 and bottom portion 96. A recycle pan wall 92 helps to achieve a more uniform liquid flow profile inside the pan 88. The pan 88 has an inwardly sloped flared lower pan wall 98 (FIG. 3), with an inner surface 100 and an outer surface 102, comprising an annular inwardly sloping frustoconical flared wall extending downwardly and inwardly at an angle of inclination from the bottom portion 96 of the upright wall 92. The sloping wall 98 extends downwardly and inwardly at an angle of inclination ranging from about 30° to 60° in relation to the vertical axis, and preferably from about 40° to 50°. A bottom edge 104 of the sloping pan wall 98 is attached to and above upper end portion 80 of the downcomer 78.

High gas entrainment within oil recirculating through downcomer 78 causes high ebullating pump speeds. That is head requirements for the ebullating pump 68 rise rapidly with increased gas entrainment because, with more gas present, the pump inlet pressure falls due to the lower hydrostatic head pressure in the downcomer 78. To counteract the lower inlet pressure, the centrifugal ebullating pump 68 has to increase its speed to deliver the recirculating oil with enough pressure to drive it through the catalytic bed.

As a second stage gas/oil separator, a stationary flared annular frustoconical rigid skirt 106 (FIG. 2) is fixedly attached to the bottom edge 104 of the upright wall 92 of the recycle pan 88, and extends downwardly and outwardly therefrom to a position spaced inwardly from the upright wall 45 of the vessel 44. The skirt 106 is fabricated of a metal, such as stainless steel, which resists corrosion from the oil feed, gases and products produced in the vessel 44 and which substantially maintains its structural integrity and strength at hydrotreating conditions.

The skirt 106 extends downwardly and radially outwardly at an angle of inclination ranging from about 5° to 45° in relation to the vertical axis, preferably from 5° to 25°, and most preferably at 20° in relation to the vertical axis for best results. Since this angle far exceeds the catalyst friction angle, catalyst should freely slide off the upper surface 114 of the skirt 106. The skirt 106 has a smaller outside diameter than the inside diameter of the upright wall 45 of the vessel 44 so as to provide an annular passage or gap 107 therebetween.

The annular passageway or gap 107 must be large enough to allow the liquid (reactor oil) to freely flow, circulate and pass upwardly through the passage 107 while reciprocatingly allowing large clumps of catalyst or coke to pass downwardly through the passage 107 and return to the expanded catalyst bed level 62. Test results indicate that decreasing the span (width) and cross-sectional area of the passage 107 by enlarging and increasing the width and cross-sectional area of the skirt 106, improved gas separation performance and reduced gas holdup around the pan 88 by as much as a factor of two.

One reason for the performance improvement with the decreasing of the passage 107 width is the change in the projected area of the skirt 106 and Vapor collector 105. With a smaller passage, the skirt 106 and vapor collector 105 occupied a larger cross-sectional area, increasing its capability of capturing gas and conveying it to the conduits 118. Another reason for the improved performance was the "channeling" effect where the narrow passage 107 directed ga to a channel along the reactor vessel wall 45 where it could more readily bypass the recycle pan 88.

The minimum passage 107 width between the inner reactor wall 45 and the outer edge of the skirt 106 is a compromise between a desire to improve gas disengagement and a desire to minimize the risks associated with catalyst and coke deposits. The passage 107 must be large enough to prevent large clumps of catalyst or coke to wedge into the annulus formed by skirt 106 and the vessel wall 45. The preferred width of the passage 107 in one reactor was nine inches, to minimize this possibility.

Increasing the depth of the skirt 106 provides a vapor collector 105 with a greater cross-sectional area and greater volume. Test results have shown that a deeper skirt 106, such as from 10 inches to 14 inches, reduces by 4 to 6 volume percent the amount of gas, vapor, and bubbles that may enter into the downcomer 78. With a larger cross-sectional area, the skirt 106 and vapor collector 105 provide a larger pocket 116 for the capture and collection of vapor (gas bubbles). A deeper skirt 106 and vapor collector 105 also provide more residence time for the disengagement or separation of gas and liquid.

Gas and vapor separation improved significantly as the skirt 106 became deeper and wider. However, there are mechanical constraints. If the skirt 106 depth extends to and makes contact with the expanded catalyst bed level 62, an accumulation of coke, asphaltenes, catalysts, and other solids can adhere to the skirt 106, lowering the efficiency of the ebullated bed reactor and hydrotreating process. Extending the skirt into the catalyst also makes it difficult to control the expanded catalyst bed level 62.

The skirt 106 (FIG. 3) has an upper portion 108 and a lower portion 110. The slanted span of the skirt 106 can be about 24 inches wide. The skirt 106 has a downwardly facing bottom skirt surface 112 and an upwardly facing upper surface 114. The bottom surface 112 of the skirt 106 provides a deflector and a baffle for deflecting the rising gas bubbles or vapor in the reaction zone 52. The bottom surface 112 of the skirt cooperates with the inwardly sloping wall 98 of the recycle pan 88, to define an annular inverted V-shaped bubble-receiving pocket 116 for catching, trapping, and receiving a substantial amount of vapor and gas bubbles entrained in the oil feed and deflecting the collected vapor and gas bubbles upwardly through vapor risers or vertical conduits 118.

The vapor collector 105 and recycle pan 88 provide a two-stage separator to reduce gas entrainment in the recycle liquid (reactor oil) and gas holdup in the reaction zone 52. The vapor collector stage 105, collects, pockets, disengages and separates the vapor and gas bubbles in the liquid (reactor oil) above the reaction zone 52. The recycle pan stage 88 further disengages and separates the vapor and gas bubbles from the oil feed inside and in proximity to the recycle pan 88.

The vapor collector and assembly 105 include: (1) the flared annular frustoconical skirt 106; (2) the inwardly sloping wall 98 of the recycle pan 88; (3) the annular inverted bubble-receiving pocket 116 between the skirt 106 and the pan wall 98 for catching, trapping, and receiving vapors and gas bubbles in the oil feed and reaction zone; and (4) the vertical conduits 118 which provide a passageway for transporting or venting the collected vapor and gas bubbles away from the pocket 116 into the vapor space 124 at the top 49 (FIG. 2) of the vessel 44.

Test results indicate that the skirt 106 and vapor collector 105 reduced gas holdup around the recycle pan 88 by a factor of two or more. As the skirt 106 and wall 45 of the vessel 44 became narrower, more gas flowed through the conduits 118, and gas holdup dropped around the recycle pan 88.

Reducing gas holdup around the pan 88 benefitted separation in two ways. As gas holdup around and inside the recycle pan 88 declined, bubbles, and vapors rose faster increasing the effectiveness of the separation inside the recycle pan 88. The other effect is related to gas concentration. Lower gas concentration or holdup means that there is less gas to entrain. Thus, there is a correlation between gas holdup around the recycle pan 88 and gas entrainment in the downcomer 78. At a constant liquid recycle rate, gas entrainment in recycle liquid rose sharply as gas holdup around the pan 88 increased.

The skirt 106 and vapor collector 105 not only reduced gas holdup in the downcomer (recycle line) 78 and in the region around the recycle pan 88, but it also reduced gas holdup in the reaction zone 52 of the reactor 10. Gas holdup declined overall because less gas was recycled internally. Gas velocities dropped in the upflow region in the reaction zone 52 of the vessel 44.

One series of tests indicated that the skirt 106 and vapor collector 105 decreased gas holdup in the reactor zone from about 35 volume percent to about 30.5 volume percent.

A reduction in reactor gas holdup has significant impact on resid conversion. For example, four volume percent reduction in gas holdup is equivalent to a 2 percentage point increase in resid conversion because there is an increase in the liquid volume available for thermal reactions. This increased liquid volume also increases Ramscarbon conversion since this reaction also depends on thermal reactions.

Conduit diameter can be an important factor in the design of the vapor collector 105. If the diameters of the conduits are too large, excess liquid can flow through the conduits 118 impairing gas disengagement, liquid/gas separation and increasing gas holdup. High liquid rates flowing through the conduits 118 can also transport too much liquid into the vapor space 124. When liquid rate exceeds the rate of the product withdrawal through the product outlet line 64, liquid can flow back to the recycle pan 88 in a direction opposite the gas flow and gas disengagement.

Calculations showed that less than 20% of the liquid flowed through four two-inch conduits 118. This rate increased to over 40% when the diameter of the four conduits 118 was expanded to three inches. At the same time, calculated gas holdup in the risers dropped from 62 volume percent to 47 volume percent.

Each conduit 118 (FIG. 3) can have a lower section 120, an elongated intermediate section 119 and an optional upper open ended section or adapter 122 for attachment to supports. The lower section 120 has a smaller diameter than the adapter 122. These adapters 122 can comprise short cups with a diameter larger than the intermediate section 119 of conduit 118, such as about double that of the intermediate section 119. The adapters 122 can be useful to limit liquid splashing in the vapor space 124 and thus reducing the potential for reentrainment of the gas.

The lower section 120 (FIG. 3) of the conduit 118 is welded or otherwise securely connected to and extends upwardly from the upper portion 108 of the skirt 106 to a vapor space 124 above the liquid level 54 (FIG. 2) of the oil feed. The conduits 118 pass the vapor and gas bubbles caught in the pocket 116, to the vapor space 124 in proximity with the top 49 of the vessel 44. This minimizes entrainment and gas holdup of gas bubbles in the oil in the reaction zone 52 and increases the effective volume of the reaction zone 52 by decreasing internal gas recycle.

The lower section 120 (FIG. 3) of the conduit 118 does not extend below the skirt 106, in order to: (1) provide a smoother uninterrupted flow pattern of the oil feed, (2) prevent coking, accumulation of asphaltenes, catalysts, and other solids near the lower section 120 of the conduit 118, and (3) avoid creating an internal cylindrical baffle in the pocket 116 which would occupy valuable reactor volume, cause undesirable deflection, and interrupt the efficiency of the vapor collector 105.

It was originally expected that a vapor collector 105 without conduits would perform about the same or worse than reactors equipped with only a recycle pan, (i.e. without a skirt) and without the vapor collector 105. It was unexpectedly and surprisingly found, however, that the vapor collector 105 without conduits exhibited much better results than a reactor equipped with only a recycle pan. Through the addition of the skirt 106, vapor collector 105, and pocket 116, about 8 volume percent less gas entered into the downcomer 78. The passage 107 provided a channel or pathway along the vessel 44 wall 45 where the vapor or gas promoted channeling of the vapor and allowed the vapor to bypass the recycle pan 88 and flow directly to the vapor space 124 at the top 49 of the vessel 44.

Furthermore, it was unexpectedly and surprisingly found that a partial plugging of conduits 118 was not substantially detrimental to gas disengagement and gas holdup reduction until all of conduits 118 were blocked because substantial gas disengagement and reduction of gas holdup occurred in the pocket 116 of the vapor collector 105. As compared to a vapor collector 105 with two or four open conduits 118, the vapor collector 105 without conduits or with plugged conduits allowed about 4 volume percent more gas into the downcomer 78.

It was also found that increasing the number of conduits 118 is similar to increasing conduit diameter because the total cross-sectional area of the conduits increases. When this area becomes too great, gas entrainment gets worse. Since it is important that the total cross-sectional area of the conduits 118 be small enough to prevent a substantial passage of liquids (reactor oil), the number of conduits 118 should be increased only if the conduit 118 diameter can be decreased in a compensating manner.

Preferably, the total cross-sectional area of all of the conduits 118 should be less than 1.5% of the cross-sectional area of the vessel 44 for best results. Each conduit 118 should also have a sufficient inner diameter to avoid plugging or clogging by catalyst, coke, etc.

While the illustrative embodiments are preferred for the best results, it may be desireable in some circumstances to have: (1) more or less than six conduits extending above the skirt; (2) staggering or varying the heights of the conduits above the skirt; (3) staggering the distances by which the conduits are spaced from the center of the skirt; or (4) extending one or more of the conduits below the skirt.

Ribs or reinforcing struts 126 (FIG. 3) and 128 can be utilized to stabilize and secure each conduit 118 to the skirt 106. The lower struts 126 are generally triangular and extend between and securely connect the lower section 120 of conduit 118 to the upper portion 108 of the skirt 106. The upper strut 128 extends between and securely connects the lower section 120 of the conduit to the upright wall 92 of the recycle pan 88.

Figure 4:
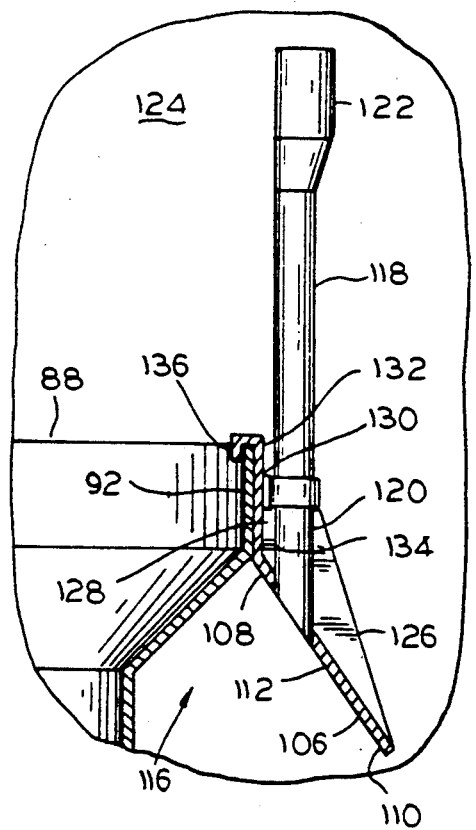

FIG. 4 illustrates another embodiment of the vapor collector 105. In FIG. 4, the upper portion 108 of the skirt 106 includes an annular upright wall 130, which has a diameter that is slightly larger than the diameter of the upright wall 92 of the recycle pan 88, to simplify the retrofitting and attachment of the skirt 106 to recycle pan 88. The upright skirt wall 130 is positioned against the pan wall 92 in abutting relationship. The upright wall 130 of the skirt 106 has an upper portion 134. The upper wall portion 132 has a hook or inverted J-shaped finger 136 for attaching the inwardly facing surface of the upright skirt wall 130 to the exterior surface of the upright pan wall 92. The lower portion 134 of the upright skirt wall 130 is attached to the upper strut 128 for stabilization and enhanced structural strength and integrity.

Figure 5:
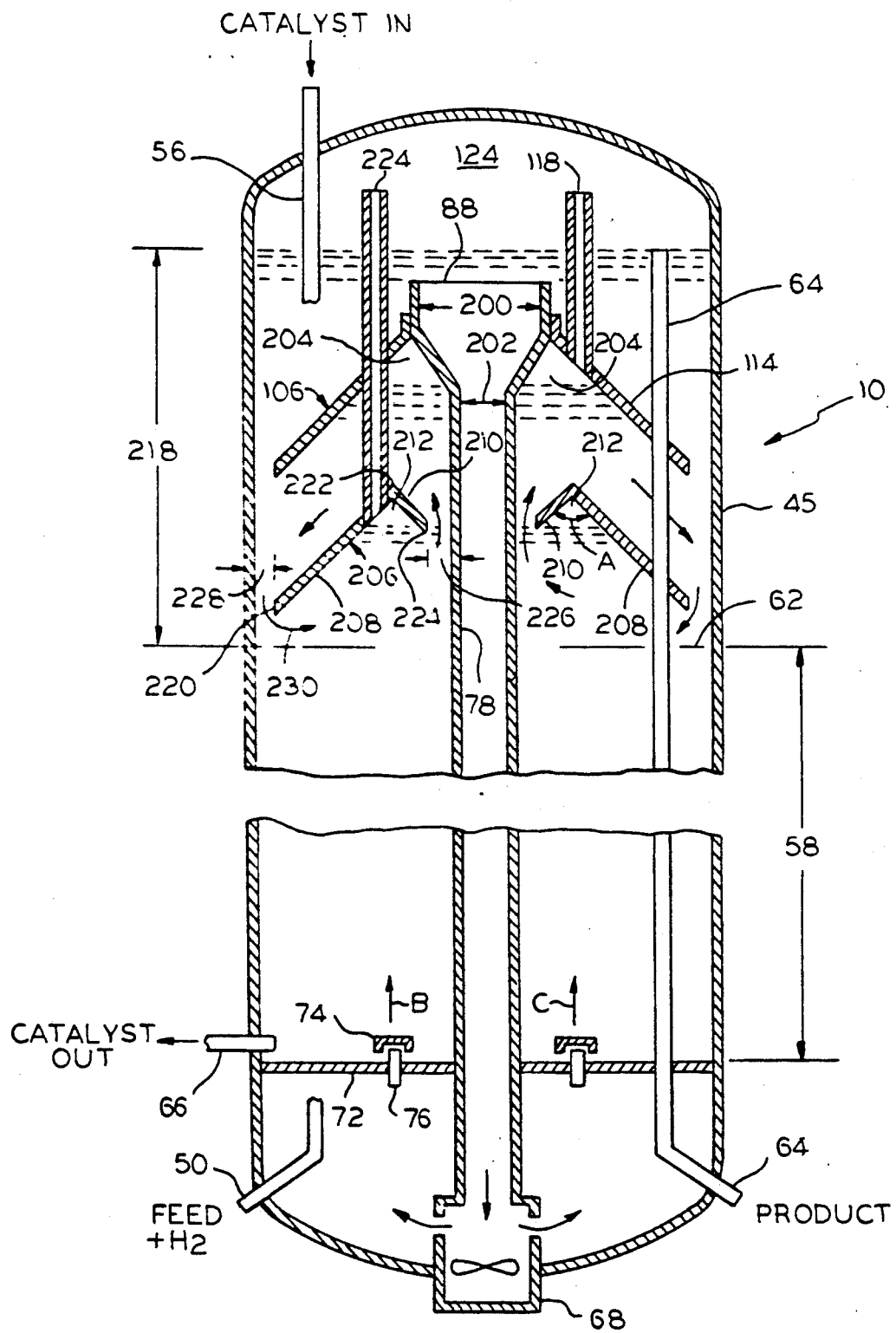
FIG. 5 is an enlarged view of the reactor of FIG. 2 which is useful for explaining the third reactor stage.

FIG. 5 is a greatly enlarged view of portions of FIG. 2 for explaining the construction and operation of the third separation stage. Since many mechanical details have already been explained in connection with the construction of skirt 106, and conduits 118, they are omitted from FIG. 5 and from this description of a third stage, with the understanding that except for the differences explained below approximately the same mechanical details are also present in the third stage of FIG. 5.

Briefly in review, a there are three vertically deployed gas separation stages. A first stage for removing gas is provided by recycle pan 88. The principle used in the first stage is that the inside diameter 200 of the pan 106 is so large compared to the inside diameter 202 of the downcomer 78 that the velocity of the oil slows. As the oil velocity slows, the natural buoyancy of the entrained vapor and gas causes them to rise and escape into a vapor space area 124 at the top of the reactor vessel.

The second stage is the frustroconical skirt 106 which is attached to the bottom of the recycle pan 88. As the processed oil rises in the reactor, the vapor and entrained gas are trapped under the skirt 106. The buoyancy of the vapor and entrained gas causes them to collect at the top of the area 204 under frustroconical skirt 106. This entrapped vapor and gas escapes from under skirt 106 via a plurality of conduits 118 into the vapor space 124 at the top of the reactor 10.

The invention adds a third stage which is a second skirt 206 suspended beneath skirt 106 by any suitable mean (not shown) such as rods or struts welded between skirts 106, 206 and other nearby structural members. The two skirts 206, 106 are constructed of similar materials and in similar manners, which have already been explained.

The second skirt 206 is a toroid having a bevel roof formed by two sides 208, 210 set at an acute angle A, with respect to each other. As with the skirt 106, the vapor and gas entrained within the oil rises into an area 212 near the ridge of the beveled roof, where is it entrapped. Again, a plurality of conduits 214 (similar to conduits 118) provide a path for the vapor and gas entrapped in area 212 to escape into the vapor zone 124.

The third stage skirt 206 provides a second function of eliminating entrained catalyst particles that reach the freeboard area 218 above the top surface 62 of the ebullated catalyst bed. In greater detail, the surface 62 at the interface between freeboard oil 216 is usually fairly well defined.

Some catalyst particles are entrained, however, into the freeboard region above the catalyst bed. If unrestrained, the particles entrained in the oil travel with it escaping from the catalyst bed (called "elutriation"). Some particles go through the downcomer 78 and some leave the reactor with the product at exit 64. The particles passing through the downcomer 78 reach the ebullating pump 68. The particles passing out of the reactor make it difficult to maintain a desired catalyst inventory within the reactor vessel. Other reasons why entrained catalyst particles are undesirable will occur to those skilled in the art.

Means are provided for eliminating the entrainment of these particles and the elutriation resulting therefrom. In greater detail, the toroidal skirt 206 has a relatively long side 208 extending from an outer periphery 220 to an apex 222 or ridge of the bevel roof. A relatively short side 210 extends from an inner periphery 224 to the apex 222 of the roof. Thus, the inner periphery or eave 224 of the roof is much higher than the outer periphery or eave 220. Also, the inner annular gap 226 between the inner periphery 224 and downcomer 78 is much larger than the outer annular gap 228 between the outer periphery 220 and the inside surface wall 45 of the reactor. The width of outside gap 228 is in the range of 1"–18" for a twelve foot interior vessel diameter, with 9" preferred for reasons pointed out above. The dimension of the gap is not critical if the desired liquid circulation pattern properly establishes itself.

It has been found that with a properly designed and shaped skirt 206 almost all of the entrained catalyst particles can be returned to the catalyst bed, thus eliminating almost all of the elutriation. In greater detail, the described construction with inner eave 224 higher than outer eave 220, and with an inner annular gap 226 which is larger than the outer annular gap 228, a liquid circulation pattern 230 establishes itself around the toroidal skirt 260. This current 230 does not interfere significantly with the upward passage of oil to the recycle pan 88 and to the product exit pipe 64. The liquid circulation pattern 230 is strong enough so that entrained particles flow downwardly through gap rather than upwardly through the gap between skirt 106 an vessel wall 45. The circulation pattern developed by skirt 206 reduces the amount of catalyst entering the product line or the recycle line.

Thus, the third stage 206 provides the following benefits:

1) Entrained gas is reduced in order to reduce the gas holdup in the downcomer and thereby improve the operation of the ebullating pump 68 by maintaining a more uniform pressure head in downcomer 78.
2) The recycle flow up the catalyst bed, down the downcomer, and back into the catalyst bed is much more stable and predictable.
3) Gas holdup is reduced in the catalyst bed by reducing gas entrained and the resulting gas recycle.
4) Catalyst elutriation is greatly reduced from the elutriating level which would normally be expected.

FIG. 6 is a collection of three graphs showing the advantages of the three stages provided by this invention. Each of these three graphs (FIG. 6) represents tests run in a relatively small ten and a quarter inch diameter column containing a catalyst bed with air and water passing through it. With a gas superficial velocity of 0.14 cubic feet per second (FIG. 4A), there was a reduction in gas holdup in the recycle line with the three stages especially as compared with the downcomer recycle pan 88 used alone. FIG. 6B shows a more dramatic improvement when the gas flow was increased to 0.35 cubic feet per second. At 0.56 cubic feet per second, there was a further improvement.

FIG. 7 shows a graph which illustrates elutriation in a column which was ten and a quarter inches in diameter, and charged with a conventional catalyst, water, and air, which were used as the three phases in the reactor. In the column, the height of the freeboard (free liquid above the catalyst bed) was 39–45 inches. This graph shows that elutriation was approximately cut in half by the second stage and virtually eliminated by the third stage.

Figure 8A:
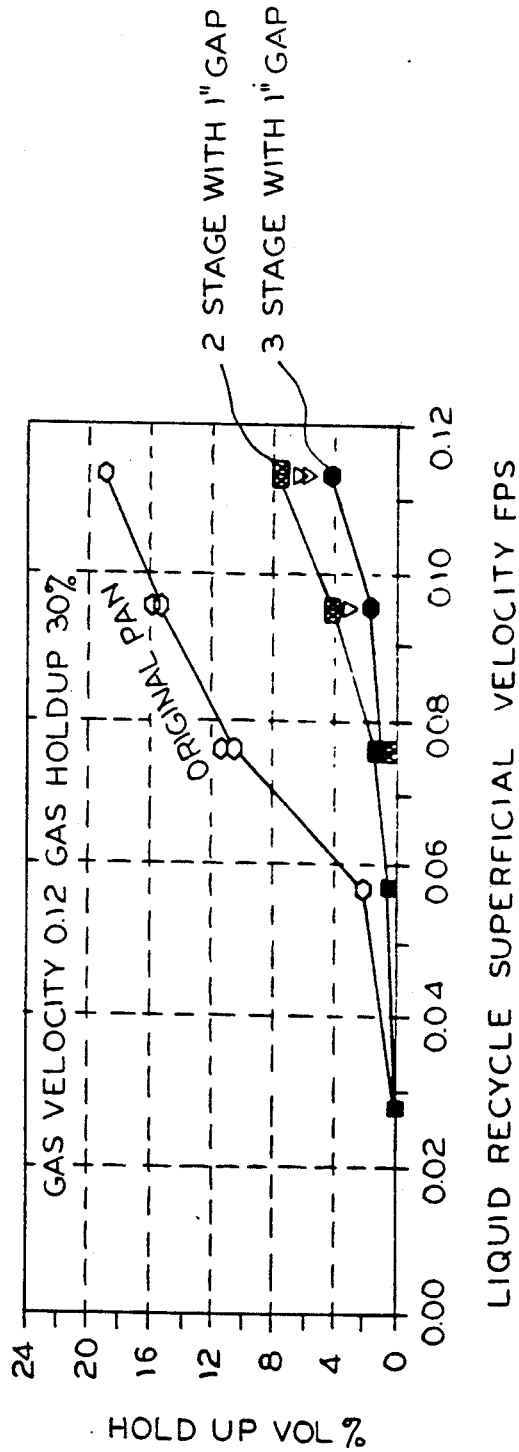
FIGS. 8 A and B are two graphs taken from tests conducted in a column which was four feet in diameter charged with catalyst, nitrogen, and kerosene to indicate the comparative advantages of the one, two, and three stages of the invention.
Figure 8B:
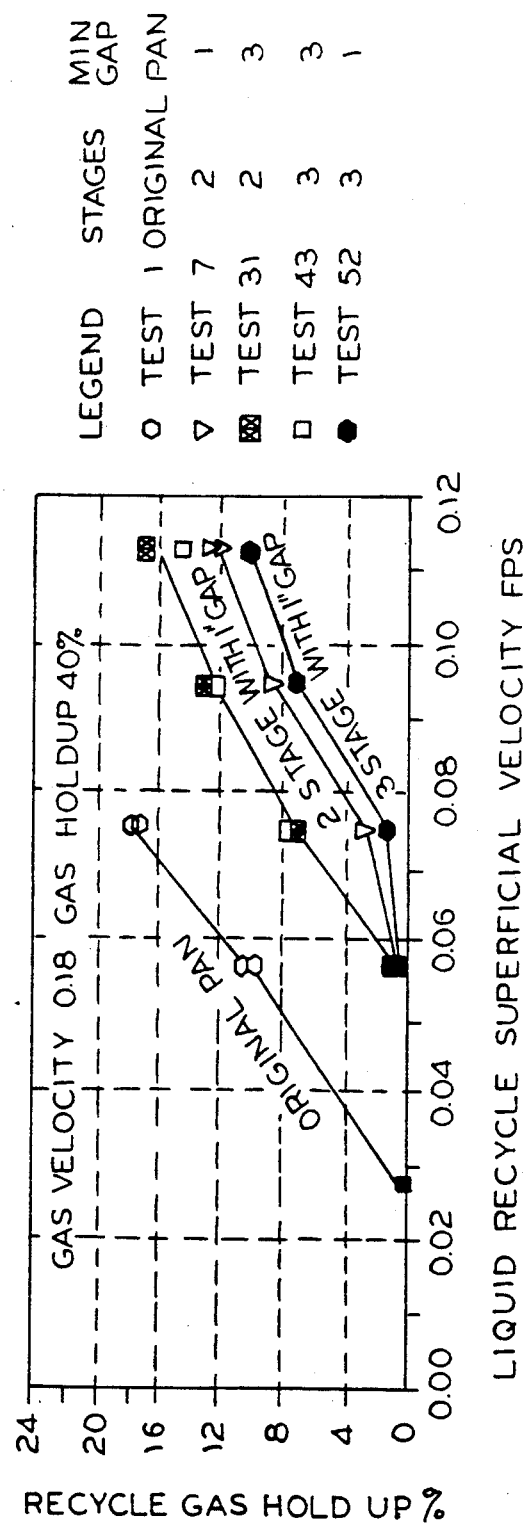

FIGS. 8A, 8B are the results of tests conducted on the inventive structure in a pilot plant column which is four feet in diameter that was charged with catalyst, kerosene, and nitrogen.

Figure 9:
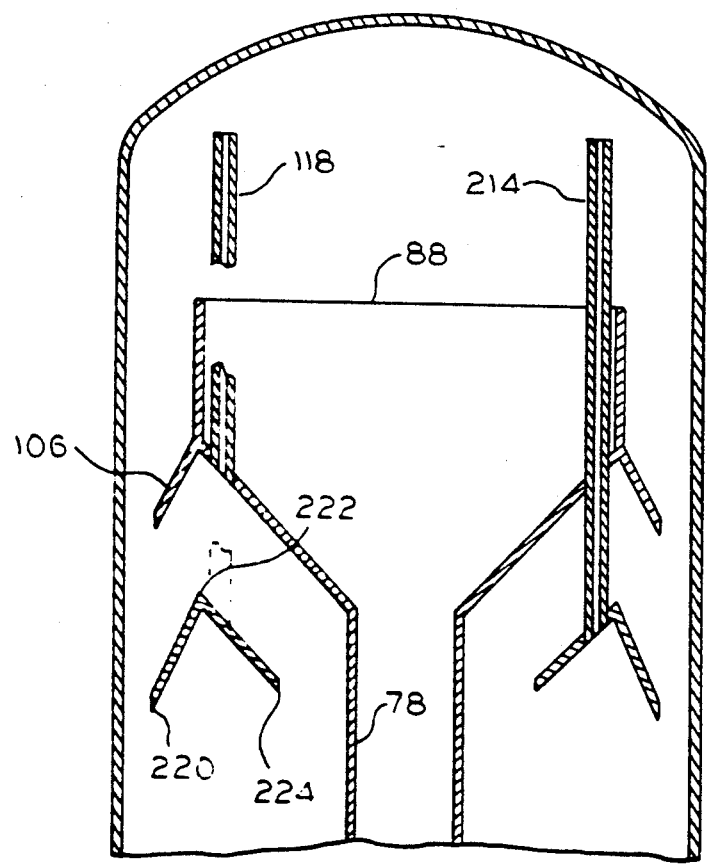
FIG. 9 shows the pertinent dimensions of the column used to run the tests reported in FIGS. 8A, 8B.

FIG. 9 shows the dimensions of the four foot diameter pilot plant column used for conducting the tests recorded in FIGS. 8A, 8B. The recycle pan 88 was three feet in diameter with a wall height of twelve inches. The vertical height of the second stage skirt 106 (FIG. 5) was eight inches. The vertical height of the third stage toroidal skirt 206 was six inches. There was a four inch vertical separation between the apex 222 of the third stage 206 and the lower most periphery of the second stage 106. There was a two inch vertical difference between the level of inner eave 224 and the level of outer eave 220. The outer gap 228 at the reactor wall 45 was varied from one to three inches for both of the skirts 106 and 206 (a three inch gap was used during the test reported in FIGS. 8A, 8B). There was a six inch inner gap 226 between the inner periphery of toroidal skirt 206 and the downcomer 78.

FIG. 8A gives the test results for a gas velocity of 0.18 cubic feet per second, with a gas holdup in the order of about 40%. In each case, the addition of the third stage gave an improvement which was judged substantial. Further, it was found that, in general, decreasing the outer gap 228 between the vessel wall and the outer periphery of the skirts produced a significant improvement. The addition of the third stage 206 decreased gas holdup in the recycle line by up to 3 vol. %.

The foregoing description has explained a presently preferred embodiment. However, various modifications are immediately apparent to those skilled in the art. For example, the skirts or baffles have been described as being somewhat conical in cross-section. It should be understood that other shapes such as domes, inverted somewhat flat bottomed pans, or the like may also be used. The various surfaces should set at an angle which will cause any catalyst to slide off and not to collect on the baffle itself.

Another modification is to provide still more baffles. There may be a fourth, fifth . . . nth stage of baffles. Each baffle should be in the freeboard zone and should not extend into the catalyst bed.

Those who are skilled in the art will readily perceive how to further modify the invention. Therefore, the appended claims are to be construed to cover all equivalent structures which fall within the true scope and spirit of the invention.

The claimed invention is:

1. An ebullated bed reactor comprising an elongated closed vessel having a top and a bottom and including means for inputting hydrogen and oil into the bottom thereof, said vessel containing a catalytic bed which may be fluidized by a bottom feed of oil and hydrogen which moves in an updraft through said bed in response to its own buoyancy; downcomer means having a top and a bottom centrally located within said vessel, said downcomer means extending from a location near the top of said vessel to a location near the bottom of said vessel, ebullating pump means at the bottom of said downcomer means for recirculating at least some of said oil from the top of said vessel through said downcomer means and back into said catalytic bed, three gas separation stages comprising a recycle collection pan, and two vertically deployed stationary flared annular frustoconical rigid skirts, means at the top and adjacent to the upper end of said downcomer means for removing vapor and gas entrained in said oil, said downcomer means having a predetermined inside diameter, a first of said stages defined by said recycle collection pan at said top of said downcomer means, said recycle pan having an inside diameter which is larger than said predetermined inside diameter of said downcomer, said larger diameter causing oil velocity and hydrogen motion to be reduced within said recycle pan before said oil descends through said downcomer means, a second of said stages defined by one of two said frustoconical skirts and being attached to and dependent from said recycle pan for collecting vapor and gas from said oil, and a third of said stages defined by a second of said two annular skirts and having a bevel roof, said third stage being attached to and suspended below said second stage to collect gas from said updraft before it reaches said second stage.

2. The reactor of claim 1 wherein said third stage toroidal skirt surrounds said downcomer means with a first annular gap between an inside periphery of said toroid and said downcomer means, a second annular gap between an outside periphery of said toroid and a wall of said reactor, said first annular gap being larger than said second annular gap.

3. The reactor of any one of the claims 1 or 2 wherein said bevel roof has an apex ridge with one side sloping downwardly therefrom to eaves at an inside perimeter and another side sloping downwardly therefrom to eaves at an outside perimeter, the length of said one side being much less than the length of said other side.

4. The reactor of claim 3 wherein said bevel roof toroid is positioned to cause liquid circulation patterns around the toroidal skirt.

5. The reactor of claim 4 including means for venting each of said second and third stages to carry away the vapor and gas collected by said second and third stages.

6. A reactor for refining resid, said reactor comprising an elongated vessel containing catalyst particles, means for feeding a mixture of oil and gas into a plenum defined beneath said catalyst particles with enough force to create an ebullated catalyst bed and elutriate said particles, downcomer means for recycling said oil through said bed, liquid recycle pan means attached to an upper end of said downcomer means, means for withdrawing a gas product from a level in said vessel which is higher than said recycle pan means, and means for substantially precluding passage of said elutriated particles into said downcomer means and said product withdrawing means by creating a circulating current around said precluding means in a region surrounding said downcomer means and below said recycle pan means, said current redirecting elutriated catalyst downwardly toward said catalyst bed, said precluding means supported below the recycle pan means in proximity to said upper end and surrounding said downcomer means.

7. The reactor of claim 6 wherein said precluding means comprises a plurality of baffle means for entrapping, said elutriated particles into said downcomer means and said collecting, and venting said gas from said mixture.

8. The reactor of claim 6 wherein said precluding means comprises means for guiding and directing said elutriated particles out of said mixture and back to said catalyst bed.

* * * * *